United States Patent [19]

Fauck et al.

[11] Patent Number: 4,653,811
[45] Date of Patent: Mar. 31, 1987

[54] RELAY VALVE DEVICE

[75] Inventors: Gerhard Fauck, Hanover; Karl-Heinz Deike, Pattensen; Bernd Kiel, Wunstorf, all of Fed. Rep. of Germany

[73] Assignee: WABCO Westinghouse Fahrzeugbremsen GmbH, Hanover, Fed. Rep. of Germany

[21] Appl. No.: 789,692

[22] Filed: Oct. 21, 1985

[30] Foreign Application Priority Data

Oct. 25, 1984 [DE] Fed. Rep. of Germany ....... 3439086

[51] Int. Cl.⁴ .......................... B60T 8/18; B60T 15/02; B60T 15/12
[52] U.S. Cl. .................................. 303/28; 137/627.5; 303/50; 303/84 R
[58] Field of Search ...................... 303/28, 84 A, 29, 3, 303/2, 30, 13, 14, 40, 15, 84 R, 7, 8, 9, 118, 50–56, 22 R, 22 A, 23 R, 23 A, 6 C, 60; 137/627.5; 188/349, 195, 151 A

[56] References Cited

U.S. PATENT DOCUMENTS

| | | | |
|---|---|---|---|
| 3,190,700 | 6/1965 | Fites | 303/7 |
| 3,302,982 | 2/1967 | Pekrul | 303/40 X |
| 3,413,042 | 11/1968 | Herold | 303/22 A X |
| 3,861,761 | 1/1975 | Siebold et al. | 303/52 |
| 3,964,794 | 6/1976 | Scholz | 188/195 X |
| 4,030,757 | 6/1977 | Durling | 303/28 |
| 4,116,492 | 9/1978 | Reinecke | 303/52 X |
| 4,410,218 | 10/1983 | Bueler | 303/7 X |
| 4,455,051 | 6/1984 | Falk | 303/28 X |

FOREIGN PATENT DOCUMENTS

| | | |
|---|---|---|
| 1480621 | 9/1969 | Fed. Rep. of Germany . |
| 2527029 | 1/1976 | Fed. Rep. of Germany . |
| 2453466 | 5/1976 | Fed. Rep. of Germany . |
| 2548973 | 7/1977 | Fed. Rep. of Germany . |
| 2820107 | 11/1979 | Fed. Rep. of Germany . |
| 2918032 | 11/1980 | Fed. Rep. of Germany . |
| 3023482 | 1/1982 | Fed. Rep. of Germany . |
| 3205228 | 9/1983 | Fed. Rep. of Germany . |

Primary Examiner—Douglas C. Butler
Attorney, Agent, or Firm—J. B. Sotak

[57] ABSTRACT

A relay valve device which is actuated by the presence of a control signal pressure to a higher pressure supply into a consumer circuit than when the control signal pressure is not present. The relay valve device includes a first control surface and a second control surface, and includes a shut-off device disposed in the feed line of the control pressure to the second control surface. The shut-off device is opened when the control signal pressure is present and is closed when the control signal pressure is not present, and also causes the second control surface to be connected with atmosphere.

10 Claims, 2 Drawing Figures

RELAY VALVE DEVICE

FIELD OF THE INVENTION

This invention relates to a relay valve device and, more particularly, to a dual-circuit compressed air relay valve for a motor vehicle braking system employing a shut-off valve, located in a feed line, to open and close a passageway leading to a pressure control surface.

BACKGROUND OF THE INVENTION

A previous dual-circuit brake valve device with relay valve device is shown and disclosed in published German Application DT No. 25 48 973C2 and, more particularly, reference is made to FIG. 3 thereof. The second portion is designed as a relay valve to which is passed a control pressure to control the brake pressure, namely, first brake pressure that is supplied to the first brake line circuit.

In the following description, it will be understood that the term "control pressure" includes the "first brake pressure", while the term "consumer line or circuit" includes the "second brake line or circuit", and that the term "air pressure control system" includes the entire "motor vehicle brake control system" under the respective associated circumstances.

Presently, the state of the art relay valve has a relay piston having first and second control surfaces, in which only the first control surface is capable of receiving control pressure.

When pressure is applied to the first control surface, a second control pressure is essentially passed to the second control surface at the same time. In one case, the amount of pressure supplied from the relay valve to the consumer line or circuit depends upon the ratio between the first control surface and the reaction surface. On the other hand, it depends upon the ratio of the sum of the pressure appearing on the first and second control surfaces relative to the reaction surface, and also upon the pressure level of the first control pressure and the second control pressure. In the present conventional relay valves, the first control surface is smaller than the reaction surface, and the sum of the area of both control surfaces is essentially equal to the reaction surface, while the second control pressure (within a given range) is variable in relation to the control pressure and is equal to this, at the most. Due to this relay configuration of the present state of the art, the pressure supplied to the consumer line or circuit does not follow one or more definite given characteristic curves relative to the control pressure. Rather, the state of the art relay valve has a characteristic range in which the pressure supplied to the consumer line or circuit is reduced relative to the control pressure or is equal to the control pressure, most of the time.

There are some applications where a signal pressure is at an essentially constant level in the pressure control system and is independent from the control pressure and where the pressure which is supplied by a relay valve device into a consumer line or circuit, namely, the second brake pressure supplied into a second brake circuit, is intended to follow a first characteristic curve in accordance with the control pressure for as long as a signal pressure is present, and is intended to follow a second characteristic curve which is at a lower value when the signal pressure is no longer present. For this type of operation, the initially-described conventional relay valve device cannot be used because the appearance of the signal pressure to the second control surface would result in a continuous pressure in the consumer line or in the second brake circuit for the duration of the application.

OBJECTS AND SUMMARY OF THE INVENTION

Accordingly, this invention is based on the problem to improve a relay valve device of the conventional-type in such a manner that when actuated, the improved relay valve supplies (while a signal pressure of essentially constant level is in effect) a pressure into the consumer line or circuit which, along with the control pressure, follows a first characteristic curve; and which, when the signal pressure is removed, supplies a pressure to the consumer line or circuit which, along with the control pressure, follows a second characteristic curve that includes pressure levels lower than that of the first characteristic curve. This problem is solved, by the invention, by employing a unique relay valve device for a compressed air system which supplies air pressure to a consumer line from a source of supply pressure in accordance with the pressure level of a control pressure having an inlet valve connected from the source of pressure with the consumer line, and having an outlet valve which connects the consumer line to atmosphere, and having a relay piston to actuate the inlet and outlet valves comprising:

(a) said relay piston having a first control surface to which the control pressure is applied and a second control surface;

(b) said relay piston having a reaction surface which conveys the supply pressure of the consumer line;

(c) said relay piston is adapted to cause the control pressure to move the intake valve toward an opening direction and to move the outlet valve toward a closeing direction, and in which the supply pressure in the consumer line causes the outlet valve to move toward an opening direction and causes the inlet valve to move toward a closing direction.

(d) said control pressure is adapted to be applied to the second control surface; and (e) a shut-off device is located in a feed line to convey the control pressure to the second control surface, so that the shut-off device is actuated in response to a signal pressure and exhibits an open passage during the duration of the signal pressure.

According to this concept, the solution of the invention is achieved in that the second control surface of the relay piston is also connected to the first control surface during the presence of the control signal pressure, and thus increases the ratio between effective control surface area and reaction surface area of the relay piston.

A relay valve device of this type can be developed, which includes a dual-circuit brake valve device for a compressed-air-actuated motor vehicle brake system comprising:

(a) the first circuit includes a control valve which is controlled by a regulating force to cause a first storage reservoir to supply a first brake circuit with a first brake pressure that is a function of the regulating force;

(b) the second circuit includes a relay valve that is controlled by the first brake pressure to supply a second brake circuit with a second brake pressure that is a function of the first brake pressure;

(c) the relay valve includes an intake valve leading to the second brake circuit which is interconnectable to either the first storage reservoir or to a second storage reservoir, and includes an outlet valve leading to the second brake circuit which can be connected to atmosphere, and includes a relay piston which actuates the inlet and outlet valves;

(d) the relay piston includes a first control surface, upon which acts the first brake pressure, and also a second control surface;

(e) the relay piston includes a reaction surface, upon which acts the second brake pressure;

(f) the relay piston is acted upon by the first brake pressure to cause the intake valve to move in the opening direction and to cause the outlet valve to move in the closing direction, and is acted upon by the second brake pressure to cause the outlet valve to move in the open direction and to cause the intake valve to move in the close direction;

(g) the first brake pressure is applied to the second control surface; and (h) a shut-off device is located in a feed line so that the first brake pressure, leading to the second control surface, can be controlled by a control signal pressure and the shut-off device allows free pressure passage when the control signal pressure is present.

The subject invention can be practiced regardless of whether the sum of the first and second control surface areas of the relay piston is equal to, smaller than, or larger than its reaction surface area, and is independent of the normal characteristic response pressure curve. The pressure supplied to the consumer circuit is a pressure which is equal to the control pressure or to the first brake pressure, so that the new characteristic curve may be lower than or greater than the normal characteristic curve.

The subject invention can also be practiced independently of the size of the first control surface relative to the size of the reaction surface. The first control surface may be smaller or greater than the reaction surface or may be equal to it. In the first instance, the air pressure or the second brake pressure, which is supplied to the consumer circuit, may follow the first characteristic curve or be above, equal to, or below the control pressure or the first brake pressure, respectively, depending on the ratio of the sum of the first and second control surfaces; while the stated pressures along the second characteristic curve are lower as compared to the control pressure or first brake pressure, respectively. In the second instance, said pressures are lower as compared to the control pressure or the first brake pressure, respectively, both along the first characteristic curve and along the second characteristic curve. In the third instance, said pressures are higher as compared to the control pressure or the first brake pressure, respectively, along the first characteristic curve and equal to same along the second characteristic curve.

By integrating the shut-off device in the relay valve device or brake valve device, respectively; it is possible to obtain an advantageous, compact, and cost-effective design. However, the shut-off device may also constitute an independent assembly.

The invention can be used to advantage when the control signal pressure in a motor vehicle braking system motor vehicle is operated in the trailer mode and/or bobtail mode or tractor-only mode. In this case, the dual-circuit brake valve device makes it possible to provide that the second brake circuit is at a higher second brake pressure to be supplied for the trailer operation than for the bobtail operation. As a rule, the second brake circuit will be assigned to the rear axle brakes; however, there are also applications where the second brake circuit is assigned to the front axle brakes. Accordingly, a relay valve device can be employed in a case of the type just mentioned, with the advantage that it can be inserted in any of the brake circuits and thus offers greater flexibility. For possible retrofittings as well, the present relay valve device is particularly advantageous.

In one unique embodiment, the shut-off device is designed as a check valve with a valve slide that has a piston surface to which control signal pressure can be applied. The control signal pressure causes the valve slide to assume a second position in which it releases the passage through the feed line of the control pressure or first brake pressure, respectively, to the second control surface. Upon removal of the control signal pressure, the valve slide, through a reset spring, is brought into a first position in which it blocks the feedline.

In the pressure instance, where the control signal pressure is employed in either the trailer or bobtail operation for the motor vehicle, it is advantageous to use, as a control signal pressure, the storage pressure from the trailer storage line. In this case, the piston surface of the valve slide of said check valve can be directly supplied with the storage pressure from the trailer storage line.

In another unique arrangement, the shut-off device may be designed as either a separate or an integrated magnetic control. In this case, the control signal pressure, again, is the storage pressure in the trailer storage line and is monitored by a manometric switch. While the control signal pressure is in effect, the manometric switch opens or closes the latter's electric circuit, which causes the control element of the control to assume the passage position. In the blocking position, the control element is adjusted by a magnet, a reset device, or a reset spring.

BRIEF DESCRIPTION OF THE INVENTION

The above objects and other attendant features and advantages of the subject invention will become more readily apparent when the following detailed description is considered in conjunction with the following drawings, wherein:

FIG. 1 illustrates a vertical, cross-sectional view of a dual-circuit relay brake valve device in accordance with the present invention; and FIG. 2 shows the characteristic response curve of the relay brake valve device illustrated in FIG. 1.

DETAILED DESCRIPTION OF THE INVENTION

Figure 1:
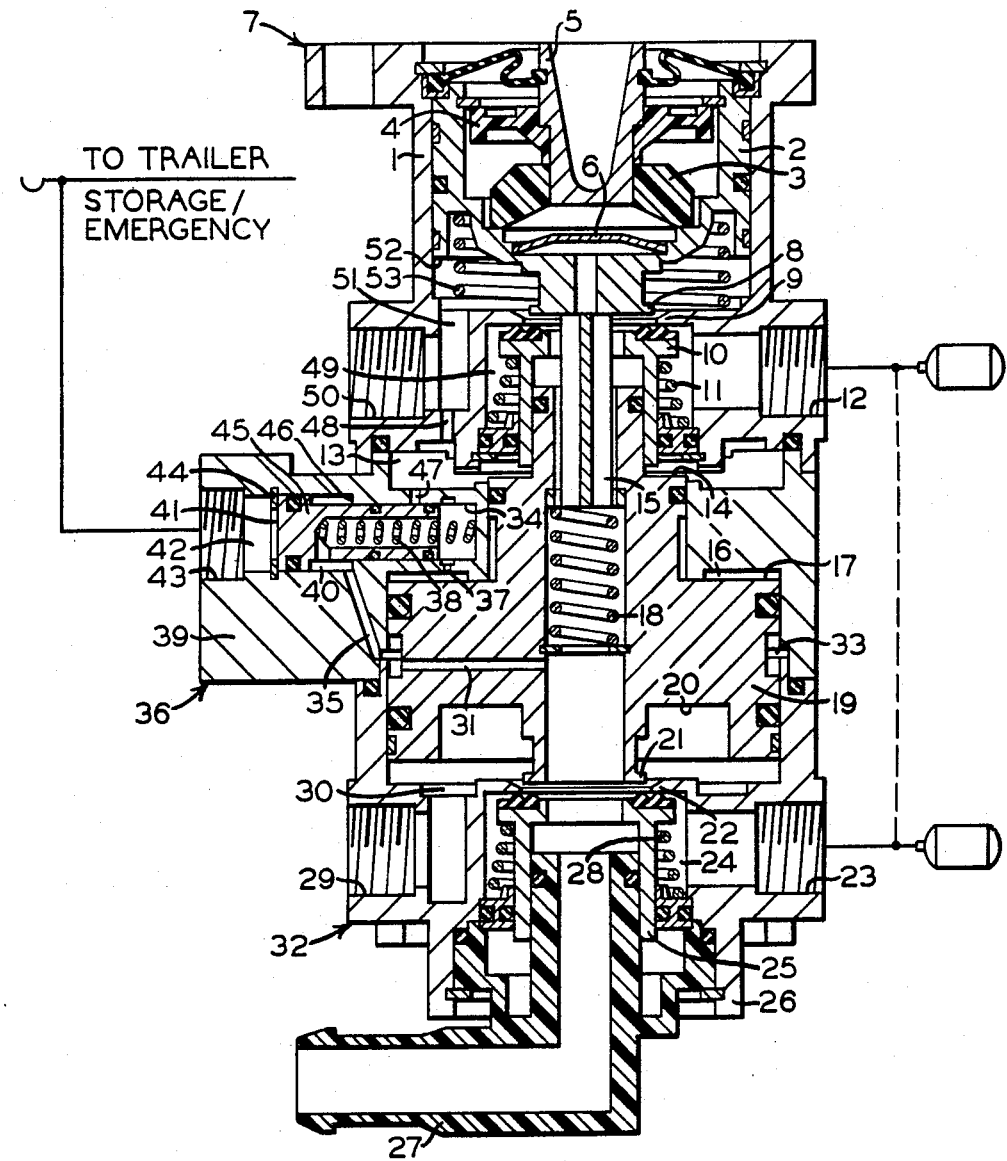

Referring to the drawings, it will be seen that the brake valve (represented in FIG. 1) includes a control valve, generally designated 7. The control valve 7 includes a first fluid circuit, formed in the valve housing comprising, an upper housing portion 1, a middle housing portion 39, and a lower housing portion 26, plus a shut-off device which is designed as a check valve 36; and includes a relay valve 32 which is designed as a second fluid circuit.

The control valve 7 includes a first valve body 10, which is sealed and longitudinally-movable in relationship with the housing, which includes an intake seat 9 to form a first intake valve 9, 10. The first intake valve 9, 10 leads to a first storage connection 12, which is connected to a first brake pressure chamber 51, which includes a first brake connection 50. The first valve body 10 is urged by a biasing spring 11 supported in the upper housing portion 1, against the first intake seat 9, and thus causes the first intake valve 9, 10 to move in the closing direction. As shown, coaxial to the first valve body 10, is a movable graduated piston 2, which is suitably sealed and is longitudinally movable in the upper housing portion 1. As shown, the underside of valve 10 is designed as a graduated surface 52, which limits the first brake pressure chamber 51. The graduated piston 2 extends into the first brake pressure chamber 51 and has a tappet-like extension (not numbered) which is provided with a first outlet seat 8, with which the graduated piston 2 is adapted to engage the first valve body 10, with the first valve body 10 forming a first outlet valve B, 10 with outlet seat 8. The first valve body 10 is of hollow construction.

As shown, an upper hollow area is formed in the graduated piston 2; and facing away from the graduated surface 52, there is a thrust piece 4, 5 including a longitudinally movable spring plate 4 and a middle piece 5. As shown, a graduated spring 3,6 is located between the thrust piece 4, 5 and graduated piston 2. In the present instance, the graduated spring 3, 6 consists of a rubber spring 3 and a cup spring 6, with the cup spring 6 not coming into effect until a later actuation phase of the control valve 7. It is readily apparent that the graduated spring 3, 6 may also be designed in any other appropriate manner, as a helical spring, for example.

It will be seen that in the first brake pressure chamber 51, there is also a spring 53, which is supported on one hand by the upper housing portion 1, and on the other hand by the graduated surface 52. The spring is pretensioned to urge the graduated piston 2 in the opening direction relative to the first outlet valve 8, 10, and ensures the opening of the first outlet valve 8, 10 when control valve 7 is not actuated.

It will be noted that the relay valve 32 includes a second valve body 25 which is sealed and is longitudinally movable in the lower housing portion 26, and a relay piston 19 which is sealed and is longitudinally movable in both the middle housing portion 39 and the lower housing portion 26. As shown, both are disposed in a coaxial alignment to the control valve 7.

In addition, a second intake seat 22, which is located in the lower housing portion 26, and the second valve body 25 form a second intake valve 22, 25, which leads to a second storage chamber 24, can be connected to a second brake pressure chamber 30. It will be seen that both the chambers 24 and 30 are located in the lower housing portion 26. The lower housing portion 26 is also provided with a second storage connection 23 which is connectable to the second storage chamber 24, and a second brake connection 29 which is connectable to the second brake pressure chamber 30. The second valve body 25 is a hollow member which is biased against the second intake seat 22, toward the closing direction of the second intake valve 22, 25, by a spring 28 which is situated and supported in the lower housing portion 26. As shown, a hollow elbow 27 is located in the second valve body 25, and is designed as a cover of lower housing portion 26. The second valve body 25 is sealed and is longitudinally movable in relation thereto.

As shown, a hollow relay piston 19 is located above the second valve body 25 and is coaxially aligned therewith. The hollow relay piston 19 has its underside designed as a reaction surface 20 for the second brake pressure chamber 30. The piston 19 has disposed in the vicinity of the reaction surface 20, a circumferential O-ring seal (not characterized), namely, the lower end of the housing portion 26. It will be noted that, beginning from reaction surface 20 and proceeding in the direction of the second valve body 25, the relay piston 19 includes a hollow tappet-like extension (not characterized) which is provided with a second outlet seat 21, which is adapted to engage the second valve body 25 and is arranged to form a second outlet valve 21, 25.

It will be seen that in the upper section of the control valve 7, there is a relay piston 19, which is designed as a graduated or stepped piston. The smaller stepped area is designed as a first control surface 14. The relay piston 19 defines a first control chamber 13 which is enclosed between middle housing portion 39 and upper housing portion 1, while the larger stepped area is designed as a second control surface 17. The relay piston 19 defines a second control chamber 16, which is located in middle housing portion 39.

The outside diameter of the second control surface 17 is equal to the outside diameter of reaction surface 20. However, it is evident to one skilled in the art that the outside diameter of the second control surface may be smaller or larger than the outside diameter of the reaction surface; in which case, the diameter of the first control surface may be smaller or larger than the diameter of the reaction surface or equal to same.

The relay piston 19 is suitably sealed against the middle housing portion 39, at its outer periphery, with the diameter of the first control surface 14; and in the vicinity of the second control surface 17, at its outer periphery, with the diameter of the second control surface 17 by means of O-ring seals (not characterized). It will be seen that, located between the seal (near the reaction surface 20) and the seal (near the second control surface 17), the relay piston 19 is provided with a circumferential groove which is designed as atmospheric chamber 33. The atmospheric chamber 33 is connected with the hollow space in relay piston 19, via a piston channel 31, which extends in a radial direction.

A hollow connection piece (not characterized) extends above the first control surface 14 of the relay piston 19, and is sealed and is longitudinally movable relative to the interior of the hollow first valve body 10.

The hollow interiors of valve bodies 10 and 25 of relay piston 19 and of elbow 27 form a vent canal (not characterized), so that the first brake pressure chamber 51 and the second brake pressure chamber 30 are connected to atmosphere when the respective associated outlet valves 8, 10 or 21, 25, respectively, are open.

As shown, located in the bottom of upper housing portion 1, there is an opening for connecting the first brake pressure chamber 51 with the first control chamber 13, which serves as control connection 48 for the relay valve 32.

The check valve 36 is located in the middle housing portion 39. The check valve 36 consists of a valve slide 45 which is suitably sealed and moves longitudinally between two preset positions in a guide 34, which is essentially transverse to the axis of the relay valve 32. With its first face, which is designed as piston surface 44, the valve slide 45 defines a switching chamber 42 which is connectable to a signal connection 43. As shown, provided in the second frontal area of the valve slide 45, is a blind hole, which accepts a reset spring 38 that is supported between valve slide 45 and middle housing portion 39, and which urges the valve slide 45 in the direction of a housing stop 41 that defines the first position of the slide. The housing stop 41 is designed as an axial retaining ring as is well-known. The second position of valve slide 45 is limited by a second housing stop 46.

As shown, a small hole 47 is formed in the guide 34 which communicates with the first control chamber 13. Also, a small hole 37 is formed in the guide 34 leading to the second control chamber 16. The hole 47 is longitudinally displaced in relation to the hole 37.

It will be seen that the two holes form respective connections between the first control chamber 13 and the second control chamber 16. As shown, first control chamber 13 is connected, via control connection 48, so that the first brake pressure from the first brake pressure chamber 51 is regulated by control valve 7; and a connecting line, represented by feed holes 37, 47, interconnect the first brake pressure to the second control surface 17 of relay piston 19.

The valve slide 45 includes three noncharacterized O-rings for sealing against an internal surface of the guide 34, which is designed as a step bore. As shown, located between the first seal nearest to the piston surface 44 and the middle second seal, is an atmospheric chamber 40. The chamber 40 is connected via a cross hole, formed in the blind hole of the valve slide 45; and via a bore 35, formed in the middle housing portion 39, to the atmospheric chamber 33. The second seal and the third seal, located adjacent to the second frontal side of valve slide 45, are arranged in such a manner that When the slide valve 45 is in the second position, two feed holes 37 and 47 are in communication and thus establish a connection therebetween and therefore release the feed line. Now, when the slide valve 45 is in the first position, the feed hole 37 is connected to the blind hole of the valve slide 45 and thus is connected to atmosphere via the cross hole, the atmospheric chamber 40, the bore 35, the atmospheric chamber 33, the piston channel 31, and the vent channel.

It will be seen that the tappet-like extension of graduated piston 2 includes a piston rod 15, which extends through the first valve body 10 into the cavity of relay piston 19. As shown, disposed between the lower face of piston rod 15 and the retaining ring, located in the cavity of relay piston 19, is an auxiliary spring 18. The piston rod 15 is designed as a cross-shaped, transverse section so that it occupies only a minor portion of the free space sectional area of the cavity of relay piston 19.

It will be understood that in the following functional description, it will be assumed that the dual-circuit brake valve device is installed, in place, in a motor vehicle braking system.

The control valve 7 is connected via the first storage or supply connection 12, to a first storage tank or reservoir and via the first brake connection 50 to the front axle brake circuit. The thrust piece 4, 5 is coupled to the operator's brake pedal directly or via a suitable lever mechanism.

The relay valve 32 is connected via the second storage or supply reservoir connection 23, a second storage tank, and via to the second brake connection 29, with a rear axle brake circuit.

The check valve 36 is connected, at the signal connection 43, to a storage coupling head.

As previously noted, such an installation is common in the automotive industry. However, in some installations, it is also common where it is permissible to interconnect the second storage connection 23 to the first storage. It is also common practice to connect the brake circuits interchanged in relation to the described installation.

Initially, let us assume that the motor vehicle is being operated in the trailer mode. Under such an assumption, there is present, at the storage coupling head, a storage pressure from a trailer storage or supply line. Via the signal connection 43, this storage pressure is conveyed to the switching chamber 42, and is also applied to the piston surface 44 of the valve slide 45. The pressure pushes the valve slide 45 against the force of the reset spring 38 into its second position. This establishes a connection between the second control chamber 16 of relay valve 32 and its first control chamber 13.

When the brake valve device is in its nonactuated state, the first intake valve 9, 10 and the second intake valve 22, 25 are closed; while the first outlet valve 8, 10 and the second outlet valve 21, 25 are open. As a result, the brake circuits are vented to the atmosphere via the respective associated outlet valve and the venting port. In this state, biasing spring 53 is effective to make certain that the first outlet valve 8, 10 is opened to cause the venting of the front axle brake circuit. When the brake valve device is actuated, the effect of this spring 53 is nullified.

When the brake pedal is actuated by the operator, its downward movement is transmitted to the graduated piston 2 via thrust piece 4, 5 and the graduated spring 3, 6. After pedal movement surpasses the opening stroke of the first outlet valve 8, 10, and after the closing of the first outlet valve 8, 10, the graduated piston 2 moves the first valve body 10 downwardly and causes the first intake valve 9, 10 to open. In so doing, the connection between the first brake pressure chamber 51, namely, the front axle brake circuit and atmosphere, is interrupted, and a communication path is established between the first storage chamber 49 and the first brake pressure chamber 51.

The compressed air can now flow from the first storage tank via the first storage connection 12, into the first brake pressure chamber 51 and the front axle brake circuit, for so long as the first brake pressure continues to build up and until the value of the compressive force, acting upon the graduated surface 52, counterbalances the controlling force introduced into the graduated piston 2 from the brake pedal via thrust piece 4, 5 and graduated spring 3, 6. In this case, the graduated spring 3, 6 is being compressed by the previous opening stroke of graduated piston 2 so that the first outlet valve 8, 10 and the first intake valve 9, 10 are simultaneously closed. In this state, the control valve 7 is in its end position.

The first brake pressure builds up in the first brake pressure chamber via the control connection 48, the first control chamber 13 of relay valve 32, the open feed ports 37, 47, and the second control chamber 16.

The first brake pressure serves as control pressure for the relay valve 32. Under the pressure effect, the relay piston 19 starts a downward motion, and after surpassing the opening stroke of the second outlet valve 21, 25, it carries along the second valve body 25 and, in so doing, opens the second intake valve 22, 25. As a result, the connection between the second brake pressure chamber 30, namely, the rear axle braking circuit, and atmosphere, is interrupted; and the connection between the second storage chamber 24 and the second brake pressure chamber 30 is opened, with the result that the second brake pressure builds in the second brake pressure chamber 30 and, via the second brake connection 29, to the rear axle brake circuit. When an equilibrium condition has been reached between the compressive forces acting on the first or second control surface 14 or 17, respectively, and those acting on the relay piston 19 via the reaction surface 20, the relay piston 19 causes the second outlet valve 21, 25 to become closed; and simultaneously, with the closing of the second intake valve 21, 25, the piston moves back by as much as the previous opening stroke of the second intake valve 22, 25 and the relay valve 32 assumes its end position.

In the present case, it is assumed that the combined areas of the first and second control surfaces 14 and 17 are essentially equal to the reaction surface 20. Thus, the second brake pressure, acting on the reaction surface 20 when the relay valve 32 is in its end position, is essentially equal to the first brake pressure which acts on the first and second control surfaces 14 and 17.

If the force on the foot pedal is reduced, the first outlet valve 8, 10 is temporarily opened and the first brake pressure is decreased until a new equilibrium is established at the graduated piston 2. Thus, the control valve assumes an end position once again. Since the reduction of the first brake pressure also affects the balance at the relay piston 19, the second outlet valve 21, 15 also opens temporarily until the second brake pressure in the second brake pressure chamber 30 is essentially equal to the first brake pressure. Accordingly, this reduction in the second brake pressure causes the relay valve 32 to assume a new end position as well.

If the force on the foot pedal is removed completely, the graduated piston 2 returns to its original position, which causes the first outlet valve 8, 10 to open completely; with the result that the first brake pressure chamber 51 and the front axle brake circuit, as well as the first or second control chamber 13 or 16, respectively, of relay valve 32 are completely vented. This also causes the second outlet valve 21, 25 to open fully so that the second brake pressure chamber 30 and the rear axle brake circuit are completely vented as well.

If the total area of the first and second control surfaces is smaller than the reaction surface, then it is evident that, in the end position of the relay valve, the second brake pressure is lower than the first brake pressure. Inversely, the second brake pressure is higher than the first brake pressure if the total area of both control surfaces is greater than the reaction surface 20. In each case, the reduction of the pedal power causes the operation as explained above.

In the event of a compressed-air-related failure of control valve 7, i.e., if no first brake pressure builds up in the first brake pressure chamber 51 and in the front axle circuit, a mechanical connection is established between the graduated piston 2 and the relay piston 19 when the brake pedal is activated. Under such a condition, the graduated piston 2 is moved by the force of the foot pedal, and carries along the first valve body 10 until this rests with its face on the first control surface 14 of relay piston 19. As a result of this, the graduated piston 2, the first valve body 10, and the relay piston 19 are effectively combined to form an integral, structural unit which takes the place of the graduated piston 2. The resulting unit, in combination with the second valve body 25, as well as the second intake valve 22, 25, and the second outlet valve 21, 25 effectively control the rear axle brake circuit, which is connected to the second brake connection 29 according to the aforementioned functional description for control valve 7.

If the relay valve is designed such that the sum of the control surface areas of the relay piston is smaller than the reaction surface area, it is possible, in the event of compressed air related failure of the control valve, namely, deviation from the normal characteristic of the relay valve, to increase the second brake pressure up to the full available pressure of the second storage tank. The same functional operation occurs when the control valve 7 has reached full capacity; that is, when in the first brake pressure chamber and in the front axle brake circuit, the full pressure of the first storage tank is present and pedal power is further increased. The described feature of pressure-increase in the rear axle brake circuit or in the second brake circuit, respectively, may be of significance when extreme braking power reserves are to be used in an emergency.

Now, let us assume that the motor vehicle is operated in the bobtail mode. In this case, only atmospheric pressure is present in switching chamber 42 and on the piston surface 44 of slide valve 45, so that the slide valve 45 is being biased to its first position by the reset spring 38. This causes the feed line 37, 47 to be blocked and the second control chamber 16 of relay valve 32 to be connected, via the blind hole to the venting channel, as described above. In this case, upon actuation of the brake pedal and thus of the control valve 7, the first brake pressure only acts via control connection 48, upon the first control surface 14. Since the first reaction surface 20 is larger than the first control surface 14, a second brake pressure is sufficient in the second brake pressure chamber 30, which is lower in comparison to the first brake pressure to produce an equilibrium of forces at relay piston 19 and to bring relay valve 32 into its end position.

Therefore, during bobtail operation of the motor vehicle, the second brake pressure, supplied to the rear axle brake circuit via the second brake connection 29, is reduced in comparison to the first brake pressure and to the second brake pressure during trailer operation. The degree of reduction depends on the ratio of the first control surface 14 to the reaction surface 20 or, respectively, on the ratio of the control surfaces to each other.

In the case of a design change in which the first control surface is larger than the reaction surface or equal to same, the second brake pressure, during initial operation of the motor vehicle, is higher in comparison to the first brake pressure or is equal to same, respectively. However, in any case, it is reduced in comparison to the second brake pressure supplied during trailer operation.

Particularly during bobtail operation, the frictional forces or rubbing action created by the numerous seals of the relay piston 19 have the effect that the relay piston 19 does not immediately start to move in the direction of the second valve body 25 until the first brake pressure is increased. This response delay or delayed action is remedied by the auxiliary spring 18 in combination with the piston rod 15, in that upon movement of the graduated piston 2, a subsidizing force is introduced into the relay piston 19 via the piston rod 15 and the auxiliary spring 18 to assist the pressure force of the first brake pressure. This subsidizing force also occurs during trailer braking operation of the motor vehicle, but has a secondary role in this case.

Figure 2:
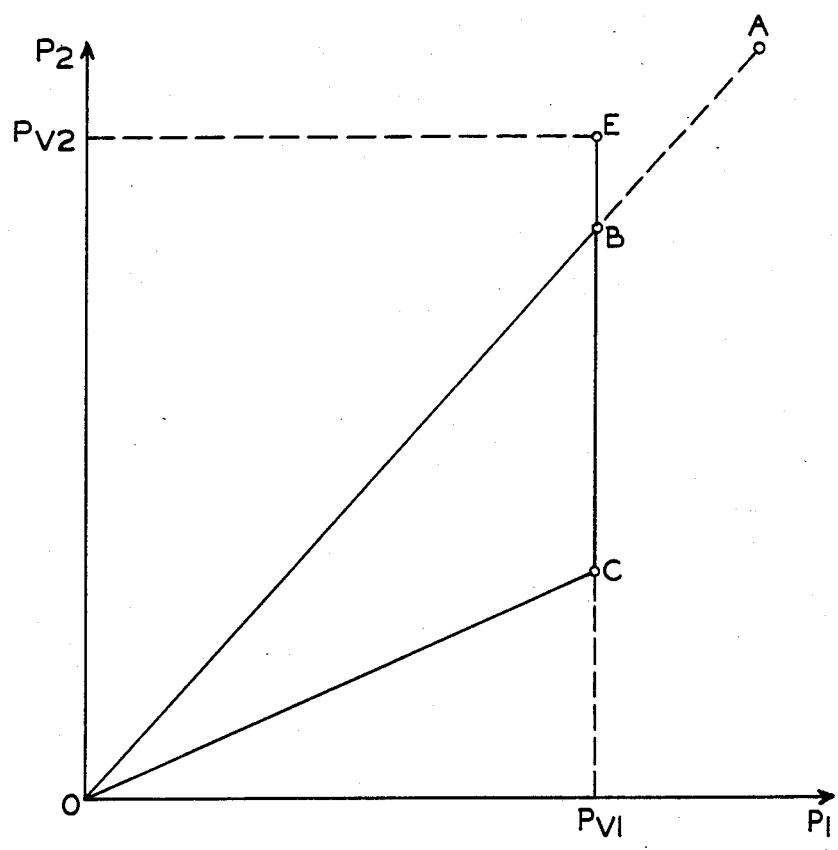

Referring now to FIG. 2, there is shown the characteristic response curves of the valve embodiment represented in FIG. 1.

The second brake pressure is symbolized by $P_2$, which is plotted along the ordinate. The first brake pressure, symbolized by $P_1$, is plotted along the abscissa. A running parallel to the ordinate, at a valve $P_{v1}$, is a pressure level that is available from the first storage tank. A running parallel to the abscissa, at a value $P_{v2}$, is a pressure level that is available from the second storage tank.

If the pressure scales on ordinate and abscissa are equal, a first characteristic curve OB (which occurs during trailer braking operation of the motor vehicle) runs along a straight line, which is 45° with respect to the coordinates which are presently represented by the points OA. At the end point B of the first response characteristic curve, the second brake pressure corresponds to the pressure of the first storage tank. It will be seen that at any point along the first characteristic line OB, the pressure $P_2$ is essentially equal to the pressure $P_1$.

It can be seen that the straight line extending between points OC represents a second characteristic response curve of the present embodiment, which occurs during initial operation of the motor vehicle, and in which the pressure $P_2$ is smaller than the pressure appearing on the first characteristic response curve and is also smaller than the pressure $P_1$ at any given point.

Under such response characteristics, a lower brake force $P_2$ is supplied to the rear axle brake circuit at a given brake force in the front axle brake circuit during initial operation of the motor vehicle than during trailer operation. These response characteristics can be employed, for example, for adjusting the brake force of different rear axle loads during trailer braking operation or initial braking operation, respectively, during occurrence thereof, for instance, with tractor trailers.

In the present instance, it is assumed that the pressure $P_{v2}$ in the second storage tank is greater than the pressure $P_{v1}$ in the first storage tank. The lines BE and CE represent the increase in pressure $P_2$, which is possible by further increasing the force on the foot pedal after the control valve 7 has been fully actuated. In the event of compressed air related failure of control valve 7, the first and second characteristic curves are on a straight line characteristic curve, which extends between points OE (not shown).

In one configuration of the relay valve, the sum of the first and second control surface areas is smaller than the reaction surface area, so that the first response characteristic curve runs below that shown by the first response characteristic curve OB. If, on the other hand, the sum of the first and second control surface areas is greater than the reaction surface area, the first response characteristic curve runs above that shown by the first response characteristic curve OB. If, in this case, the first control surface area is larger or equal to the reaction surface area, then the second response characteristic line also runs above that shown by the response characteristic line OB or, respectively, coincides with it.

The relay valve 32 in combination with the check valve 36, in the embodiment described in FIGS. 1 and 2, can also be modified to form a different type of relay valve device. For example, it will be seen that the relay piston 19 may be terminated at the first control surface 14 and the botton of the upper housing portion 1 to form a cover for the middle housing portion 39. Then, if any control pressure is applied to control connection 48, a consumer circuit connected to the second brake connection 29, a storage tank to the second storage connection 23, and if the second intake and outlet valves are considered to be the intake and outlet valves of the relay valve device, all of the previous explanations with regard to the relay valve 32 and the check valve 36 apply accordingly for such a valve device.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents, and substitutions for components of the above specifically described embodiment of the invention may be made by those skilled in the art without departing from the spirit and scope of the invention as set forth in the appended claims.

Having thus described the invention, what we claim as new and desired to secure by Letters Patent, is:

1. A relay valve device for a compressed fluid system which supplies pressure to a consumer line from a source of supply pressure in accordance with the pressure level of a control pressure having an inlet valve by which a storage chamber connected via a storage connection with the source of pressure is interconnectable to a reaction chamber connected via a consumer connection with the consumer line, and having an outlet valve by which the reaction chamber can be connected to atmosphere, and having a relay piston to actuate the inlet and outlet valves, comprising:

(a) said relay piston having a control surface divided into a first control surface, connected to a first control chamber to which the control pressure is applied, via a control connection and into a second control surface;

(b) said relay piston having a reaction surface upon which acts the pressure of the reaction chamber;

(c) said relay piston is acted upon by the control pressure in the opening direction of the inlet valve and in the closing direction of the outlet valve, and is acted upon by the pressure in the reaction chamber in the opening direction of the outlet valve and in the closing direction of the inlet valve;

(d) said control pressure is applicable via a feed line to a second control chamber connected to the second control surface; and (e) a shut-off device is located in the feed line to the second control chamber, so that the shut-off device is actuated in response to a signal pressure which is independent of the control pressure and exhibits an open passage during the presence of the signal pressure.

2. The relay valve device, according to claim 1, wherein the shut-off device is a check valve.

3. The relay valve device, according to claim 2, wherein the check valve is an integral part of the relay valve device.

4. The relay valve device, according to claim 3, wherein:

(a) a housing includes the feed line;

(b) a guide is located in the housing in which is sealedly movable, a valve slide of the check valve having a piston surface to define a switching chamber that is supplied with the signal pressure;

(c) a reset spring acts upon the valve slide, on its side facing away from the piston surface, to bias said valve slide into a first position to block the feed line and to connect the second control chamber with atmosphere; and (d) the valve slide is supplied via the switching chamber, with the signal pressure which counteracts the force of the reset spring, so that it is moved into a second position in which it opens the feed line.

5. The relay valve device, according to claim 1, wherein the control signal pressure is a storage pressure from a trailer storage line.

6. A dual-circuit brake valve device for a compressed-air-actuated motor vehicle braking system, comprising:

(a) a first circuit including a control valve which is controlled by a regulating force to cause a first storage reservoir to supply a first brake circuit with a first brake pressure that is a function of the regulating force;

(b) a second circuit including a relay valve that is controlled by the first brake pressure to supply a second brake circuit with a second brake pressure that is a function of the first brake pressure;

(c) the relay valve including an inlet valve by which a second storage chamber connected via a second storage connection to the first storage reservoir and selectively to a second storage reservoir is interconnectable to a second brake pressure chamber connected via a second brake connection with the second brake circuit, and including an outlet valve by which the second brake pressure chamber can be connected to atmosphere, and including a relay piston which actuates the inlet and outlet valves;

(d) the relay piston including a control surface divided into a first control surface, connected to a first control chamber to which the first brake pressure is applied via a control connection, and into a second control surface;

(e) the relay piston including a reaction surface upon which acts the pressure in the second brake pressure chamber;

(f) the relay piston is acted upon by the first brake pressure in the opening direction of the inlet valve and of the outlet valve in the closing direction and is acted upon by the pressure in the second brake pressure chamber in the opening direction of the outlet valve and in the closing direction of the inlet valve;

(g) the first brake pressure is applicable via a feed line to a second control chamber connected to the second control surface; and (h) a shut-off device is located in the feed line to the second control chamber so that the shut-off device is actuated in response to a signal pressure which is independent of the control pressure and exhibits an open passage during the presence of the signal pressure.

7. The dual-circuit brake valve device, according to claim 6, wherein the shut-off device is designed as a check valve.

8. The dual-circuit brake valve device, according to claim 7, wherein the check valve is integrated in the brake valve device.

9. The dual-circuit brake valve device, according to claim 8, wherein:

(a) a supply channel acts as the feed line;

(b) a guide is cooperatively associated with the supply channel in which is sealedly moved in an axial direction a valve slide of the check valve having a piston surface which defines a switching chamber that is supplied with the control signal pressure;

(c) a reset spring acts upon the valve slide, on its side facing away from the piston surface, to bias said valve slide into a first position to block the supply channel and to connect the second control chamber with atmosphere; and (d) the switching chamber is supplied with the control signal pressure to urge the valve slide into a second position, against the force of the reset spring, to cause the opening of the supply channel.

10. The dual-circuit brake valve device, according to claim 6, wherein the control signal pressure is a storage pressure from a trailer storage line.

* * * * *